United States Patent
Lloyd et al.

(10) Patent No.: US 9,847,148 B2
(45) Date of Patent: Dec. 19, 2017

(54) SELF-CONTAINED EMERGENCY SPENT NUCLEAR FUEL POOL COOLING SYSTEM

(75) Inventors: Timothy M. Lloyd, Santa Cruz, CA (US); David Rasmussen, Alameda, CA (US); Joel Kulesza, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1055 days.

(21) Appl. No.: 13/291,334

(22) Filed: Nov. 8, 2011

(65) Prior Publication Data
US 2012/0250813 A1    Oct. 4, 2012

Related U.S. Application Data

(60) Provisional application No. 61/469,184, filed on Mar. 30, 2011.

(51) Int. Cl.
*G21C 19/07* (2006.01)
*G21C 19/08* (2006.01)
(Continued)

(52) U.S. Cl.
CPC ............ *G21C 19/07* (2013.01); *G21C 19/08* (2013.01); *G21D 1/02* (2013.01); *G21D 1/04* (2013.01); *Y02E 30/40* (2013.01)

(58) Field of Classification Search
CPC ........ G21C 15/08; G21C 19/07; G21C 15/18; G21C 19/40; G21C 15/182; G21C 15/24;
(Continued)

(56) References Cited

U.S. PATENT DOCUMENTS 3,563,304 A * 2/1971 McGrath ............. F24D 11/0257
                                                        165/240
3,627,488 A * 12/1971 Dudley .................. C23C 10/28
                                                        138/143
(Continued)

FOREIGN PATENT DOCUMENTS

CA    2483182 A1    10/2003
DE    2944962      *  5/1981    ............. G21C 15/18
(Continued)

OTHER PUBLICATIONS

Doughton, Sandi. The Seattle Times. Washington's Hanford nuclear plant has more backup. Published Mar. 14, 2011. Available online: <http://www.seattletimes.com/seattle-news/washingtons-hanford-nuclear-plant-has-more-backup/>.*
(Continued)

*Primary Examiner* — Jack W Keith
*Assistant Examiner* — Lily C Garner
(74) *Attorney, Agent, or Firm* — Richard J. Coldren; Westinghouse Electric Company LLC

(57) ABSTRACT

An auxiliary system for cooling a spent nuclear fuel pool through a submersible heat exchanger to be located within the pool. In each train or installation, a single loop or series of loops of cooling fluid (e.g., sea water or service water) is circulated. The system is modular, readily and easily installed during an emergency and can be self operating with its own power source. Multiple trains may be used in parallel in order to accomplish the required degree of spent fuel pool cooling required.

17 Claims, 3 Drawing Sheets

(51) Int. Cl.
 *G21D 1/02* (2006.01)
 *G21D 1/04* (2006.01)

(58) Field of Classification Search
 CPC .......... G21C 15/26; G21C 19/00; G21D 3/06;
 G21D 1/02; G21D 3/04; Y02E 30/40;
 G21Y 2002/601; G21Y 2004/302; E03B
 11/16; F25D 15/00; F28F 13/06
 USPC ....... 376/203, 260, 272, 287, 293, 299, 310;
 307/46, 64, 65; 165/301
 See application file for complete search history.

(56) References Cited

U.S. PATENT DOCUMENTS

| | | | | |
|---|---|---|---|---|
| 4,033,814 | A * | 7/1977 | Bregeon et al. | 376/399 |
| 4,050,252 | A * | 9/1977 | Nakanishi | F01K 23/04 |
| | | | | 376/317 |
| 4,319,233 | A * | 3/1982 | Matsuoka | G01F 23/243 |
| | | | | 340/622 |
| 4,526,742 | A * | 7/1985 | Hannerz | G21C 15/18 |
| | | | | 376/247 |
| 4,783,306 | A * | 11/1988 | Vecsey et al. | 376/213 |
| 4,830,815 | A * | 5/1989 | Gluntz | 376/299 |
| 4,907,418 | A * | 3/1990 | DeFazio | E04H 4/129 |
| | | | | 165/159 |
| 4,963,293 | A * | 10/1990 | Burack | G21F 9/004 |
| | | | | 134/22.12 |
| 5,120,494 | A * | 6/1992 | Nazareno | F04D 7/08 |
| | | | | 376/282 |
| 5,268,942 | A * | 12/1993 | Newton | G21C 15/182 |
| | | | | 376/272 |
| 5,343,507 | A * | 8/1994 | Arnold et al. | 376/298 |
| 5,488,642 | A * | 1/1996 | Malik et al. | 376/272 |
| 5,694,442 | A * | 12/1997 | Cinotti | G21C 15/18 |
| | | | | 376/298 |
| 6,098,733 | A * | 8/2000 | Ibaraki et al. | 180/65.28 |
| 6,624,533 | B1 * | 9/2003 | Swanson et al. | 307/64 |
| 6,718,001 | B2 * | 4/2004 | Hidaka et al. | 376/283 |
| 6,773,658 | B1 * | 8/2004 | Leppanen et al. | 266/44 |
| 6,915,860 | B2 * | 7/2005 | Feller | A62C 27/00 |
| | | | | 169/43 |
| 7,057,376 | B2 * | 6/2006 | Cook et al. | 323/207 |
| 7,240,653 | B2 * | 7/2007 | Marchand et al. | 123/179.19 |
| 7,290,517 | B2 * | 11/2007 | Marchand et al. | 123/179.3 |
| 7,550,861 | B2 * | 6/2009 | Oyobe | B60L 1/006 |
| | | | | 123/1 A |
| 7,983,376 | B2 * | 7/2011 | Kojima et al. | 376/282 |
| 2002/0101951 | A1 * | 8/2002 | Nakamaru et al. | 376/282 |
| 2007/0051125 | A1 | 3/2007 | Chiusolo et al. | |

FOREIGN PATENT DOCUMENTS

| | | | | |
|---|---|---|---|---|
| DE | 2944962 | A1 * | 5/1981 | ............. G21C 19/07 |
| JP | S5467895 | A | 5/1979 | |
| JP | S58214894 | | 12/1983 | |
| JP | 60138498 | A * | 7/1985 | ............. G21C 19/07 |
| JP | H0247586 | | 2/1990 | |
| JP | H06-242279 | * | 2/1994 | ............. G21C 15/18 |
| JP | H11170057 | | 6/1999 | |
| JP | 2001133585 | | 5/2001 | |
| JP | 2005-156198 | * | 6/2005 | ............. G21C 9/004 |

OTHER PUBLICATIONS

"Nuclear Fuel Waste Pool-Cooling System Avoiding Radiation Leakage as Prim, Cooling System is Completely Housed in Fuel Waste Pool", WPI/Thomson, Jan. 1, 1985, XP007922849 (abstract).
Supplementary European Search Report dated Oct. 13, 2014 for EP App. No. 12764792.3 (EPO Form 1507S, 1503 03.82 (P04C04), P0459, 1703 01.91TRI.
International Preliminary Report on Patentability for PCT/US2012/022308 dated Oct. 1, 2013 (Form PCT/IB/373, PCT/ISA/237).

\* cited by examiner

SELF-CONTAINED EMERGENCY SPENT NUCLEAR FUEL POOL COOLING SYSTEM

CROSS REFERENCE TO RELATED APPLICATION

This application claims priority to Provisional Application Ser. No. 61/469,184, filed Mar. 30, 2011, entitled SELF-OPERATING EMERGENCY SPENT FUEL POOL COOLING SYSTEM.

BACKGROUND

1. Field

This invention relates generally to cooling systems used to cool water in a nuclear reactor power generating facility and, more particularly, to a temporary cooling system designed to supplement existing cooling systems for the Spent Fuel Pool and accommodate emergency conditions experienced in such a facility.

2. Related Art

In nuclear power generating facilities, a reactor vessel housing nuclear fuel and water is positioned in what is commonly referred to as a refueling cavity or a reactor cavity. During power generation, a primary fluid coolant, normally water, is heated by the nuclear fuel, and the heat is used to generate steam for electric power generation. During shutdowns for refueling and other periods when the reactor is not operating, the decay heat from the fuel continues to heat the water in the reactor vessel. The water must be cooled to a desired level before the fuel may be removed from the vessel and transferred to a spent fuel pool of the facility by way of the reactor cavity. The residual decay heat generated by the reactor core is cooled during shutdown by a permanently installed residual heat removal system. The residual heat removal system provides heat exchange cooling for the decay heat coming from the fuel in the reactor core during shutdown. The heat removal capacity of this system is necessarily large. During normal shutdown, the residual heat removal system is operated for a number of days in order to remove the decay heat from the fuel to a point where the fuel may be removed from the core. This is due to the fact that the spent fuel pool, the eventual storage place for the fuel, has a permanently installed cooling system, which does not have sufficient cooling capacity to remove the high level of residual heat generated by the fuel immediately following plant shutdown.

Thus, in situations requiring removal of the fuel from the reactor core, the permanent cooling system configuration in present day nuclear plants requires that the residual heat removal system be operated for a period of days in order to cool the fuel to a point where it can be safely removed to the spent fuel pool, to permit reactor servicing, such as refueling or the decontamination of components such as the reactor recirculation system. U.S. Pat. No. 5,268,942 describes an auxiliary cooling system that can be permanently stored within the containment to augment the residual heat removal system and speed up that process. Without such an auxiliary system, the servicing crew must wait several days until the residual heat removal system adequately cools the reactor core before proceeding to remove the fuel. This cool down time increases the facility's overall shutdown period, thus, increasing the cost of a shutdown operation, resulting in lost revenues, as well as the cost of replacement power purchased during the shutdown. On the other hand, the cost of such an auxiliary system or the cost of increasing the capacity of the spent fuel pool cooling system is expensive.

The Mar. 11, 2011 earthquake and tsunami in Japan led to severe damage and station blackout at the Fukushima Daiichi Nuclear Plant. Although the plant was successfully shut down after the earthquake, the ensuing tsunami rendered the plant unable to restore power to the cooling systems responsible for cooling the reactor and the spent fuel pool. This resulted in core fuel melting in three units, loss of water inventory, potential fuel failures in the spent fuel pools, and radioactive releases into the environment. Increased scrutiny is being focused on the world's nuclear power plants and the need to be able to respond to events that are beyond the nuclear plants' original design basis. The embodiments described herein expand upon the capability of existing systems in a way that enables an auxiliary cooling system to be rapidly mobilized and installed to provide a self-contained, self-sufficient means of removing decay heat from the spent fuel pool until normal plant equipment can be returned to service.

Thus, it is an object of the embodiments described herein to provide either an auxiliary installed cooling system or a portable cooling system that can be readily transported to a nuclear plant site and rapidly installed and activated to provide adequate cooling for the spent fuel pool in the event the indigenous cooling system is inoperable or proves inadequate for any reason.

It is a further object to provide such a cooling system that is self contained, and is a self-sufficient means of removing decay heat from the spent fuel pool until normal plant equipment can be returned to service.

SUMMARY

These and other objects are achieved by the embodiments described herein which provide a self-powered residual heat removal system that can be transported to and rapidly connected to a spent nuclear fuel pool at least partially filled with a liquid, such as water or borated water. The residual heat removal system includes a cooling conduit disposed within the spent fuel pool within the liquid in which the spent fuel is submerged, having an interior of the cooling conduit isolated from the liquid within the spent nuclear fuel pool. A coolant fluid reservoir, remote from the spent fuel pool, is connected to the cooling conduit by a coupling line through which a coolant can be circulated from the coolant fluid reservoir through the cooling conduit and out to a receiving pond. A circulating mechanism is provided for circulating the coolant through the coupling line. In one embodiment, the circulating mechanism is a pump powered by either a primary or an auxiliary power source. Preferably, the pump is either a diesel or gasoline driven pump. In one embodiment, the diesel or gasoline driven pump is a fire truck. Alternately, the auxiliary power source is a motor-generator or a battery. In an embodiment wherein the cooling system is permanently installed, the circulating mechanism includes a control unit that activates the circulating mechanism when the liquid within the spent fuel pool rises above a pre-selected temperature.

In still another embodiment, the cooling conduit is a cooling coil and, preferably, the cooling conduit comprises a plurality of cooling conduits, e.g., cooling coils that are connected in parallel to the coupling line, possibly utilizing multiple power sources and/or coolant fluid reservoirs. Where practically available, the coolant can be sea water or, alternately, water from any other nearby source. Additionally, a cooling tower can be associated with the receiving pond for cooling the coolant fluid before it is discharged to the receiving pond. Desirably, the cooling conduit is constructed from a seawater-resistant material such as a copper-nickel alloy selected from the group 90/10, 70/30 or Monel.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
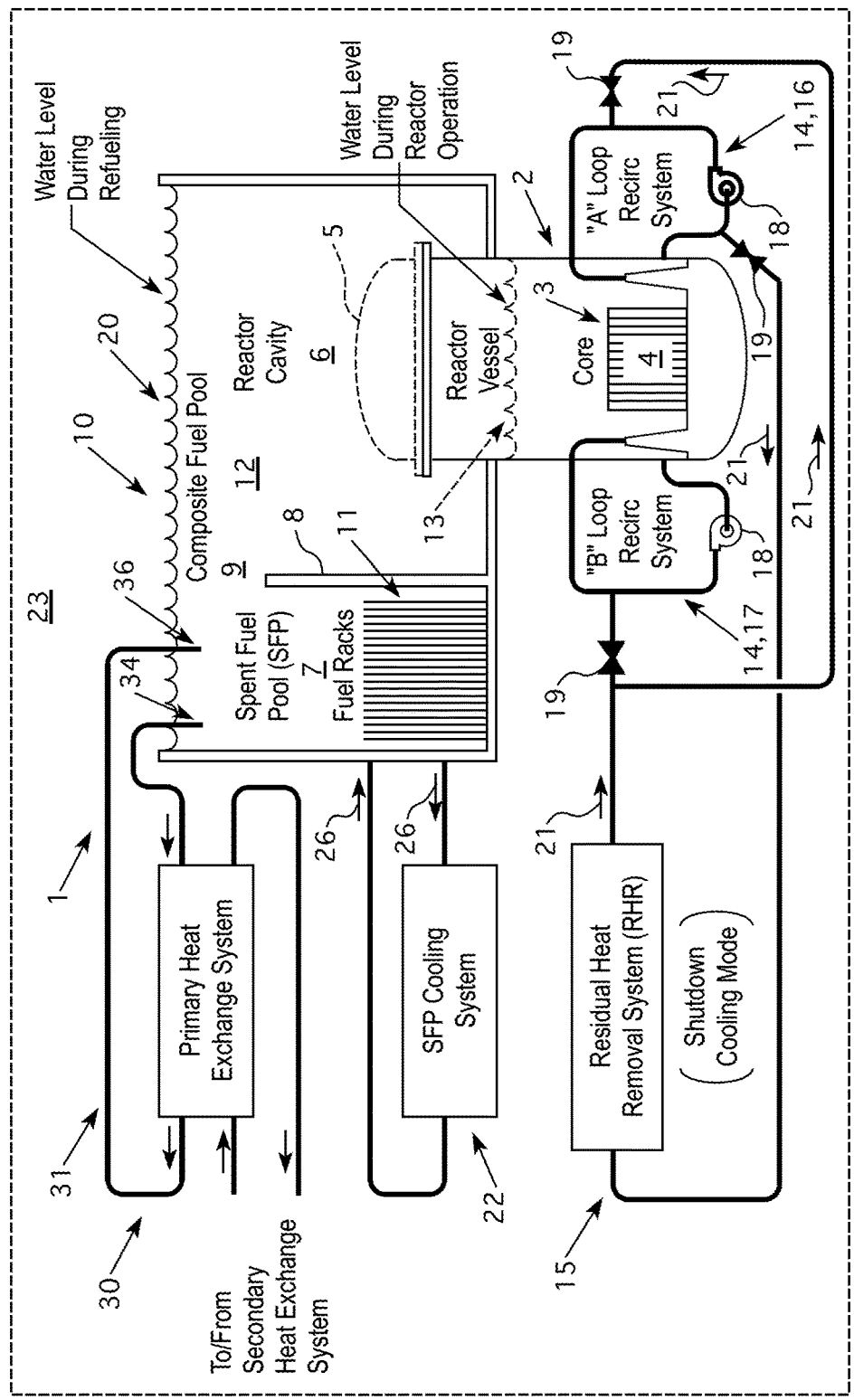
FIG. 1 is a schematic representation of the layout of the relevant components of a typical light water nuclear reactor power generating facility having an embodiment of an auxiliary residual heat removal system that may employ the benefits of the embodiments described herein.

As shown in FIG. 1, in a typical light water reactor nuclear power generating facility, only the pertinent parts of which are shown, a reactor building 23 contains a reactor vessel 2 which contains a core 3, which comprises numerous elements of nuclear fuel 4, usually in the form of fuel bundles, commonly referred to as fuel assemblies. During power generating operations, reactor vessel 2 is closed by the top or head 5. Reactor vessel 2 is positioned within a reactor cavity 6, which in some designs is fluidly connected to a spent fuel pool 7 during outages. However, even in designs where the reactor cavity is connected to the spent fuel pool during outages, containment isolation during operation requires that the spent fuel pool water be separate from the water in the refueling cavity and reactor cavity. In the facility embodiment shown in FIG. 1, the spent fuel pool 7 is separated from the reactor cavity by a wall 8 having a closable opening 9, closable by a gate (not shown) or other means known in the art to isolate the spent fuel pool 7 from the reactor cavity 6. Since various embodiments of nuclear power generating facilities are possible, the spent fuel pool 7 and the reactor cavity 6 will be jointly and separately referred to as the "composite fuel pool" 10, which will refer to any point within either the spent fuel pool 7 or the reactor cavity 6. An example of an alternate embodiment of the composite fuel pool 10 is one wherein the spent fuel pool and the reactor cavity are separated by a conduit (e.g., a "fuel transfer canal," not shown) rather than a wall 8. The spent fuel pool 7 typically contains fuel racks 11, which supports spent fuel bundles which are stored in the spent fuel pool 7.

During power generating operations, the reactor head 5 is closed and the primary fluid 12, normally referred to as the reactor coolant (typically water), is contained within the reactor vessel 2 at an operating level 13 above the core 3. The core 3 heats the primary fluid 12, which is used to generate steam which is employed as the motive power for creating electricity. The extensive piping and additional equipment used for generating power is not relevant to the instant embodiment and is thus not shown. A reactor recirculation system 14 recirculates water within the reactor vessel 2 and is fluidly connected to a residual heat removal system 15 during shutdown. In the facility shown in FIG. 1, the reactor recirculation system 14 includes an "A" loop 16 and a "B" loop 17. Recirculation is maintained by the circulation pumps 18. Valves 19 provide isolation of the reactor recirculation system 14 from the residual heat removal system 15 during power generating operations. Of course, many different configurations of piping and valves are possible and vary from facility to facility.

The facility 1 may be shut down for various reasons, including total or partial fuel replacement, decontamination of components or for other reasons. Detailed shut down procedures are required in order to maintain system safety. In order to remove the fuel bundles 4 from the core 3, the reactor head 5 is removed and the level of primary fluid 12 is raised to a refueling level 20 within the composite fuel pool 10. Following this step, the closable opening 9 is activated to an open position, allowing the primary fluid 12 to equalize the refueling level 20 within both the spent fuel pool 7 and the reactor cavity 6. Once the refueling primary fluid level 20 is stable, the fuel bundles 4 may be lifted from the core 3 and placed in fuel racks 11. However, the initial decay heat from the fuel bundles 4 must first be removed during this procedure before the fuel bundles may be removed from the core.

Once the core 3 is shut down, decay heat continues to be generated by the fuel 4. The residual heat removal system 15 is a heat exchange system designed to cool the primary fluid 12, removing the initial decay heat generated upon system shutdown. As shown by the flow arrows 21, the residual heat removal system 15 cools the primary fluid 12 and recirculates the cooled primary fluid 12 back to the reactor vessel 2. As stated above, prior to the auxiliary residual heat removal system described in U.S. Pat. No. 5,268,942, the traditional method of cooling the primary fluid 12 required operation of the residual heat removal system 15 for a number of days until the initial large amount of decay heat is removed from the primary fluid 12. The amount of heat removed during the residual heat removal system operation can be on the order of 15,000,000 BTU/hr. The residual heat removal system 15 was traditionally operated until the fuel bundles 4 were cooled to a point where they could be removed to the spent fuel pool 7, where the smaller capacity spent fuel pool cooling system 22 would continue to circulate primary fluid from the spent fuel pool 7 (as indicated by arrows 26) and remove the decay heat at a much lower rate, for example, 1,000,000 BTU/hr. The residual heat removal system 15 and the spent fuel pool cooling system 22 are permanently installed in the facility 1. Due to the permanent nature of the installation, as well as safety, redundancy, licensing and contamination issues, modification of the permanent cooling systems would be impractical and overly expensive.

A temporary auxiliary cooling system 30 is described in U.S. Pat. No. 5,268,942 and provides an immediate increased cooling capacity with no additional permanent connections to the facility 1. The cooling system 30 comprises a primary heat exchange system 31, which includes a primary heat exchanger for transferring heat from the primary fluid 12 to a secondary cooling fluid, a primary fluid pump for circulating the primary fluid through the primary fluid heat exchanger, a primary fluid pump suction line 34 and a primary fluid discharge line 36. Primary fluid 12 is circulated in the primary heat exchange system 31, where heat is transferred to a secondary cooling fluid from a secondary heat exchange system. All heat exchange equipment, pumps and other components are said to be mounted on skids and temporarily located within the facility 1. Due to severe space limitation within the facility 1, components of this auxiliary residual heat removal system 30 may be located within various locations within the facility 1. Due to radioactive particles circulating in the primary heat exchange system 31, it is preferable to locate the primary heat exchange system 31 within the containment building 23.

In contrast to the foregoing system the embodiments described herein provide a much simpler and less costly solution for supplying auxiliary cooling to the spent fuel pool at a significantly reduced cost. The embodiments hereafter described can be constructed either as an integral part of the facility or deployed as needed in the event of an emergency. The system may be used with most any facility and unlike the previous systems, may be portable and shared by multiple facilities.

In the event of an accidental loss of electrical power, a loss of function in existing spent fuel pool cooling systems, or both, the ability to maintain adequate cooling and cover for the spent fuel in a spent fuel pool is challenged. Typically, a spent fuel pool will continue to maintain a degree of cooling through the boiling of the fluid within the pool, typically borated water, for a period of days or weeks after the cooling capability has been impaired. At the point where it becomes necessary to deploy an emergency or auxiliary spent fuel cooling system, conditions may make it difficult or impossible to access the site to troubleshoot and restart existing backup systems. In extreme cases, it is conceivable that the environment of the spent fuel pool would not be accessible following the placement of an emergency backup cooling system. For this reason, it is desirable to specify a spent fuel pool cooling system with the capabilities of extended unattended operation. It is also desirable for such a system to be capable of running during a continued and protracted loss of power.

The embodiments set forth hereafter provide cooling for a spent fuel pool through the use of a submersible heat exchanger which is submerged directly within the spent fuel pool. Within each train or installation a single loop or series of loops of cooling fluid (e.g., sea water or service water) is circulated. The system described herein is modular and self-standing with the possible exceptions of supplied AC power or auxiliary cooling placed on the service water supply. Multiple trains or installations of the system can be used in order to accomplish the desired degree of spent fuel pool cooling.

The system's intended use is to mitigate the effects of a loss of electrical power, a failure of an existing spent fuel cooling system, or both. The system provided for herein functions by preventing or minimizing bulk boiling in a spent fuel pool and thus reduces the loss of fluid from the spent fuel pool. In this way, additional cooling and fluid makeup requirements are obviated or at least mitigated.

As mentioned previously, conventional spent fuel pool cooling systems circulate fluid from the spent fuel pool through one or more heat exchangers located outside of the spent fuel pool; and, also, typically through filters, demineralizers or other water processing components. The system provided herein offers a number of advantages over conventional systems of this type. The advantages include:

- The chances of a leak from the spent fuel pool to the equipment associated with the system provided for herein or into the environment are greatly reduced.
- The complexity of the system is substantially reduced, leading to improvements in system reliability and supporting its alternative use as a stand-alone system which can function in the absence of an electrical supply.
- Because only the clean (i.e., substantially non-radioactive) fluid circulates through the pumps and lines of the system, there is extremely little risk of radiation exposure to those operating or maintaining the system, and no portion of the system contributes to radiation levels in the surrounding area. The system has no negative impact on the surrounding work environment.
- The ability and intention to immerse the heat exchanger in a fluid filled spent fuel pool offers radiologic shielding rendering the system and components no worse radiologically than the existing body of fluid in the spent fuel pool.
- The system's lower weight, volume and degree of complexity facilitate its rapid assembly, testing and deployment even in remote or hard to access locations.
- A high degree of resistance to radiation or chemical degradation, due to the conditions in the spent fuel pool, and possibly the cooling fluid.

Such a system, as provided for herein, must be capable of withstanding the thermal and radiological environment of a spent fuel pool. The system must be capable of removing at least a portion of the decay heat from a fully or partially filled repository of spent nuclear fuel. The system must also provide a reasonable level of assurance that the cooling loop circulating through the immersed heat exchanger and the body of liquid in the spent fuel pool will remain physically and chemically separated. In addition, the submerged portion of the system should provide a reasonable degree of resistance to the anticipated radiation exposures to which it will be exposed. Finally, the material should be resistant to corrosion in the types of fluids anticipated; these presently include sea water as the circulating coolant and an aqueous boric acid solution in the spent fuel pool. The selection of a heat exchanger material should accomplish or address all of these concerns. One well suited example of such a material is a copper-nickel alloy (e.g., 90/10, 70/30 or Monel) or another material capable of withstanding the above noted environment.

Figure 2:
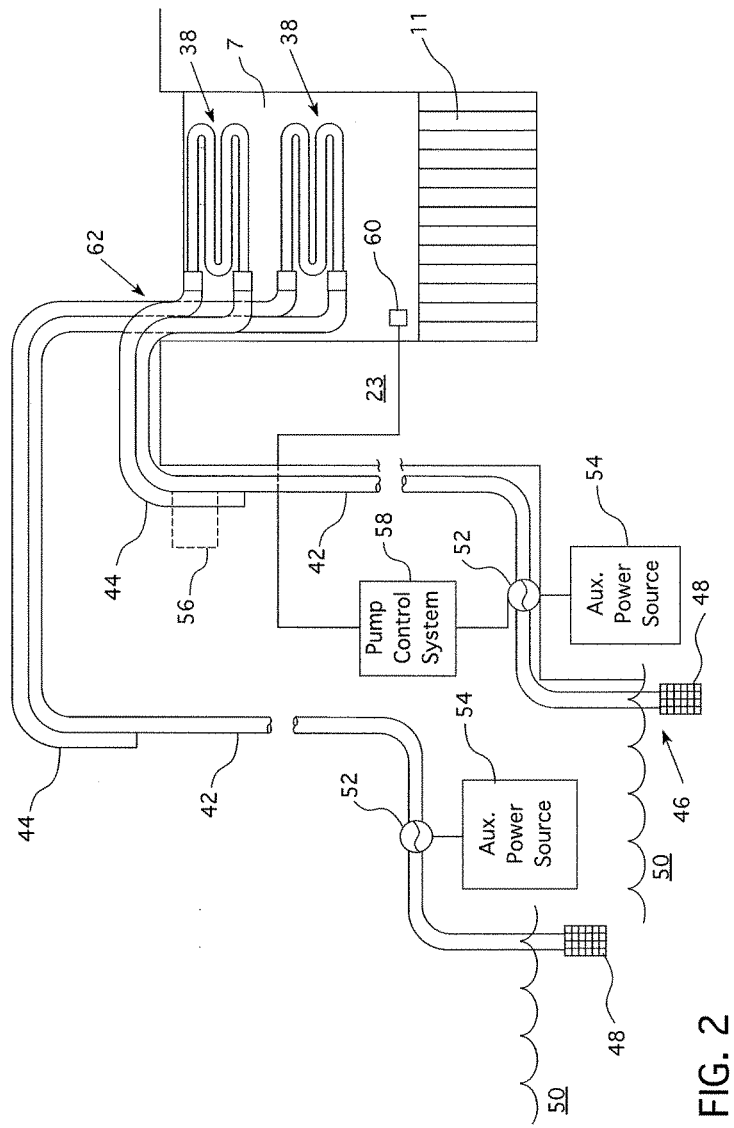
FIG. 2 is a schematic view of the spent fuel pool illustrated in FIG. 1 that incorporates the auxiliary spent fuel pool cooling system described herein.
Figure 3:
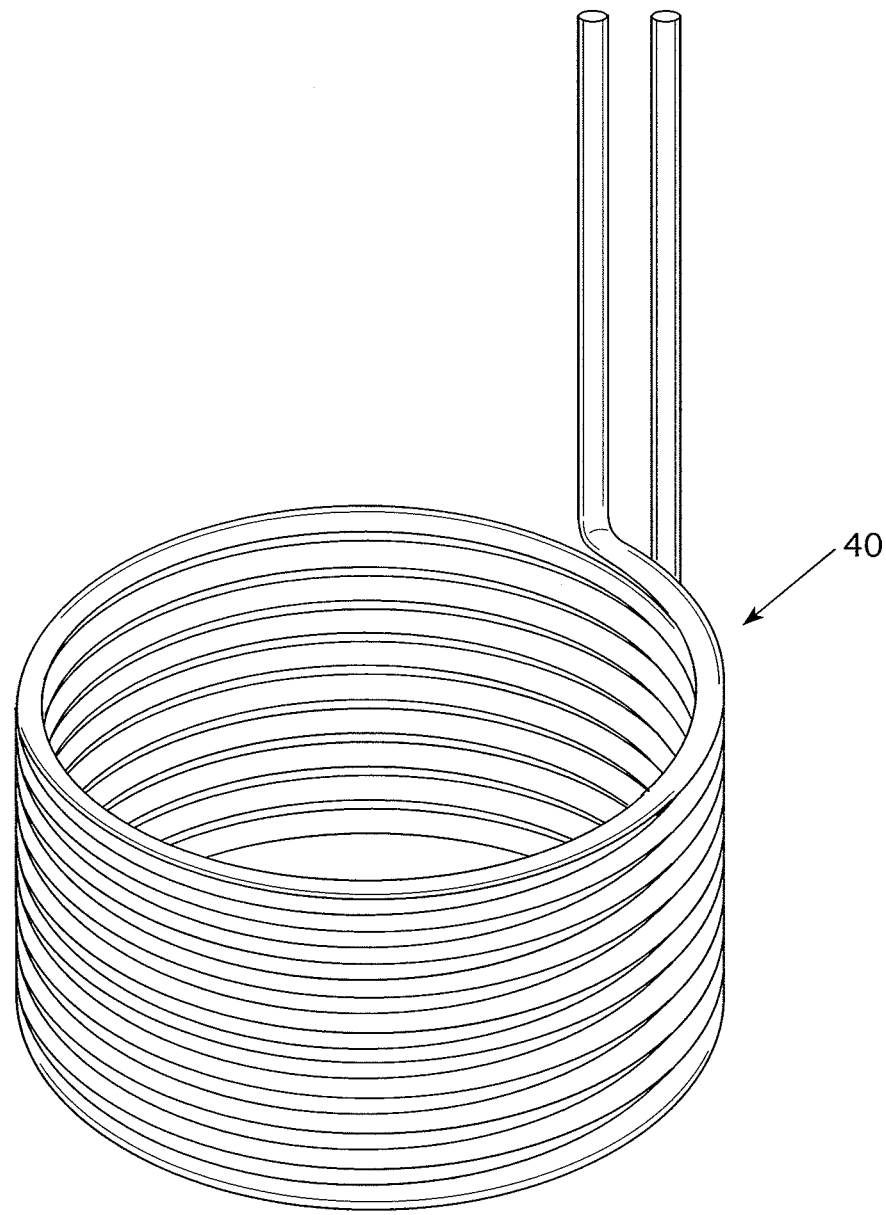
FIG. 3 is a perspective view of a submersible cooling coil which may be employed in the embodiment shown in FIG. 2.

FIG. 2 is a schematic of an embodiment of the concepts presented herein and shows a spent fuel pool 7 enclosed within a containment building 23. The spent fuel pool has fuel assembly racks 11 supported submerged in the bottom of the pool with a cooling conduit 38 submerged above the fuel assembly racks 11. The cooling conduit 38 may be a heat exchanger such as the coil tube 40 illustrated in FIG. 3. Referring back to FIG. 2, the heat exchanger 38 is connected by a coupling line 42, 44 having an inlet portion 42 and outlet portion 44. The inlet portion 42 has an intake 46 preferably with a strainer 48 that is submerged within a body of water 50 which can be sea water (where convenient), river water, a holding pond or other source of cooling fluid, generally referred to hereafter as a coolant fluid reservoir. The cooling fluid 50 is circulated by a pump 52 driven by an auxiliary power source 54. Where the pump is electrically driven, it can be powered by the line current with a diesel generator backup. Alternately, the pump can be diesel or gasoline driven and is preferably self-priming. The cooling fluid is driven through the intake portion of the coupling line 42, through the heat exchanger 38 and out through the outlet portion 44 of the coupling line where it is discharged, preferably back to the source 50. Where the source 50 is a holding pond, the coupling line outlet portion 44 may also include a cooling tower 56 or some other means of cooling the discharge before it is recirculated through the intake 46 or where the discharge, at its elevated temperature, would cause harm to the environment.

In one embodiment, where the auxiliary cooling system 62 is included as a permanent installation, the pump 52 may be provided with a control system 58 that receives inputs from sensors 60, such as thermocouples or level sensors, within the spent fuel pool 7 that provide an indication of the condition of the pool. The control system can then automatically turn on the pump 52, for example, if the spent fuel pool 7 rises above a predetermined temperature. Where the auxiliary cooling system 62 is deployed under somewhat emergency conditions, the coupling line 42, 44 may be a half-inch or larger fire hose and the auxiliary power source 54 operating the pump 52 may be a fire truck.

Thus, the spent fuel pool fluid freely contacts the outer tube walls of the heat exchanger 38, and natural and boiling circulation in the spent fuel pool aides in the exchange of heat through the outer wall into the bulk fluid. Since the primary purpose of the system is to prevent boiling or to reduce the rate of boiling, the thermal conditions allowing for less circulation in the spent fuel pool at temperatures well below boiling will not fully prevent the system from performing its function. In the event that a single train of the system removes less heat than is desired for equilibrium (i.e., total thermal losses equal thermal production), the temperature in the spent fuel pool would continue to increase or the level of boiling will increase until vigorous heat removal conditions arise at the outer surface of the heat exchanger tube. In addition, prior to this point, fluid circulation in the spent fuel pool due to the gradients in temperature will provide substantial mixing, tending to bring about a larger thermal gradient at and near the outer surface of the heat exchanger. These conditions, coupled with the selection of a highly efficient thermal conductor such as copper or a copper-nickel alloy (90/10, 70/30, Mondel, etc.), will yield high thermal efficiencies for the system. The discharge of clean, external cooling fluid preferably occurs outside of the building containing the spent fuel pool, but may be captured or retained in an alternate means, which might include, for example, the use of a retention tank from which samples can be taken to assess the possibility of any leakage or material degradation.

While specific embodiments of the invention have been described in detail, it will be appreciated by those skilled in the art that various modifications and alternatives to those details could be developed in light of the overall teachings of the disclosure. For example, two or more trains of cooling conduits can be connected in parallel to a single or multiple coupling lines to increase the cooling capacity of the system. The parallel system of cooling conduits can share a circulating mechanism or two or more of the cooling conduits could have an independent circulating mechanism. Furthermore, the coupling lines can be respectively connected to different sources of coolant to further assure redundancy, adequate amounts of coolant and reduce the impact on the environment. Accordingly, the particular embodiments disclosed are meant to be illustrative only and not limiting as to the scope of the invention which is to be given the full breadth of the appended claims and any and all equivalents thereof.

What is claimed is:

1. A spent nuclear fuel pool at least partially filled with a liquid comprising water, the spent fuel pool including:
    a cooling conduit directly immersed within the liquid within the spent fuel pool in direct heat exchange relationship with the liquid and having an interior of the cooling conduit isolated from the liquid within the spent nuclear fuel pool;
    a coolant fluid reservoir remote from the spent fuel pool connected to the cooling conduit by a coupling line through which a coolant can be circulated from the coolant fluid reservoir through the cooling conduit and out to a receiving pond;
    a circulating mechanism for circulating the coolant through the coupling line, the circulating mechanism being configured to be normally in an off state in which the coolant is not circulated through the coupling line;
    a sensor for monitoring a condition of the liquid within the spent fuel pool and providing a sensor output indicative of the condition;
    a control system connected to the sensor output and the circulating mechanism and operable to turn on the circulating mechanism when the sensor output indicates the liquid in the spent fuel pool has reached a preselected condition indicative of an abnormal state of the condition; and
    including a plurality of the cooling conduits respectively connected to the coolant fluid reservoir through a corresponding coupling line in parallel.

2. The spent nuclear fuel pool of claim 1 wherein the circulating mechanism is a pump powered by either a primary or an auxiliary power source.

3. The spent nuclear fuel pool of claim 2 wherein the auxiliary power source is a motor-generator.

4. The spent nuclear fuel pool of claim 2 wherein the pump is a diesel or gasoline driven pump.

5. The spent nuclear fuel pool of claim 4 wherein the diesel or gasoline driven pump is a fire truck.

6. The spent nuclear fuel pool of claim 2 wherein the auxiliary power source is dedicated to running just the pump.

7. The spent nuclear fuel pool of claim 6 wherein the auxiliary power source is a battery.

8. The spent nuclear fuel pool of claim 1 wherein the circulating mechanism is an active mechanism that is only activated when the liquid within the spent fuel pool rises above a preselected temperature.

9. The spent nuclear fuel pool of claim 1 wherein the cooling conduit is a cooling coil.

10. The spent nuclear fuel pool of claim 1 wherein the cooling conduit comprises a plurality of cooling conduits connecting in parallel to the coupling line.

11. The spent nuclear fuel pool of claim 10 wherein the cooling conduit is a plurality of cooling coils.

12. The spent nuclear fuel pool of claim 1 wherein the coolant is seawater.

13. The spent nuclear fuel pool of claim 1 wherein the receiving pond includes a cooling tower.

14. The spent nuclear fuel pool of claim 1 wherein the cooling conduit is constructed from a copper-nickel alloy selected from the group 90/10, 70/30 or Monel.

15. The spent nuclear fuel pool of claim 1 wherein the circulating mechanism is an active mechanism configured so that it is only activated when the liquid within the spent fuel pool reaches a preselected level.

16. The spent nuclear fuel pool of claim 1 wherein the coolant reservoir includes a plurality of coolant sources and at least some of the coupling lines are connected to separate ones of the coolant sources.

17. The spent nuclear fuel pool of claim 1 wherein at least some of the cooling conduits have circulating mechanisms that are independent of others of the cooling conduits.

* * * * *